United States Patent [19]

Phillips

[11] 4,167,695

[45] Sep. 11, 1979

[54] GENERATOR DRIVE CONTROL SYSTEM

[75] Inventor: Ernest L. Phillips, Anchorage, Ak.

[73] Assignee: Jet Accessories, Inc., Anchorage, Ak.

[21] Appl. No.: 835,574

[22] Filed: Sep. 22, 1977

[51] Int. Cl.$^2$ .................... F16D 13/22; H02P 9/06
[52] U.S. Cl. ................... 322/12; 192/67 R; 192/114 R; 244/194; 307/84
[58] Field of Search ............ 322/10, 11, 12, 40, 322/29; 307/84, 87; 192/67 R, 114 R, 114 T, 22, 30 W, 48.5; 244/83 E, 194, 197

[56] References Cited

U.S. PATENT DOCUMENTS

| | | | |
|---|---|---|---|
| 2,482,812 | 9/1949 | Treseder | 322/29 X |
| 2,700,124 | 1/1955 | Fritz | 322/11 X |
| 2,803,323 | 8/1957 | Newell | 192/67 R |
| 3,080,031 | 3/1963 | Young | 192/67 R |
| 3,723,750 | 3/1973 | Dixon et al. | 307/84 X |

*Primary Examiner*—Robert J. Hickey

*Attorney, Agent, or Firm*—Sheridan, Ross, Fields & McIntosh

[57] ABSTRACT

The system is intended primarily for use in multi-engined aircraft although it has great utility in any installation having an engine and a generator driven thereby. A kit for each engine includes a generator drive train connected to the engine to be driven thereby, a driving formation for connection to a generator, and a coupling or clutch in the drive train to decouple the generator in case of mechanical or electrical failure. Signal means may be located in the cockpit in the pilot's field of view to indicate generator failure. A switch operable by the pilot in response to the failure signal acts to remotely cause decoupling of the generator. The active signal operates means to deactivate any other decoupling switch to prevent mistakenly decoupling a properly functioning generator. Cross-connection switch means are connected to all engines and generators and may be actuated to electrically connect an active generator to the engine having the decoupled generator.

23 Claims, 10 Drawing Figures

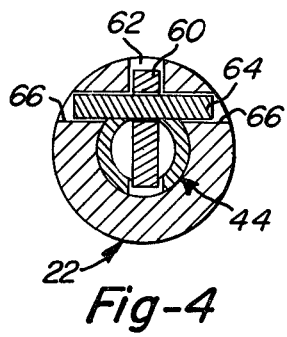
Fig-4
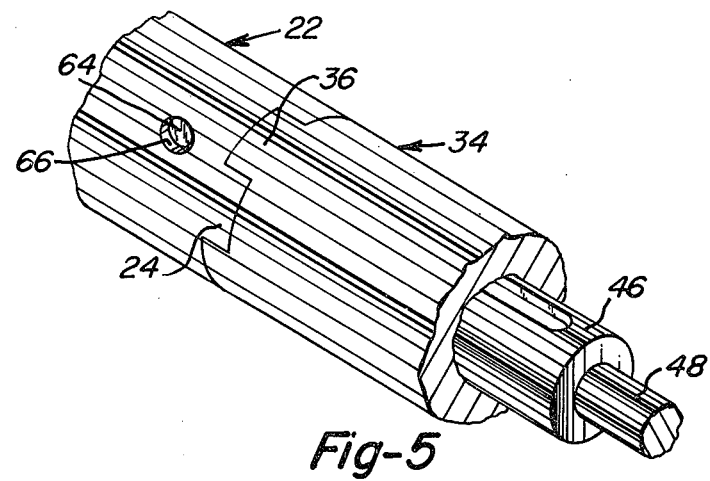
Fig-5
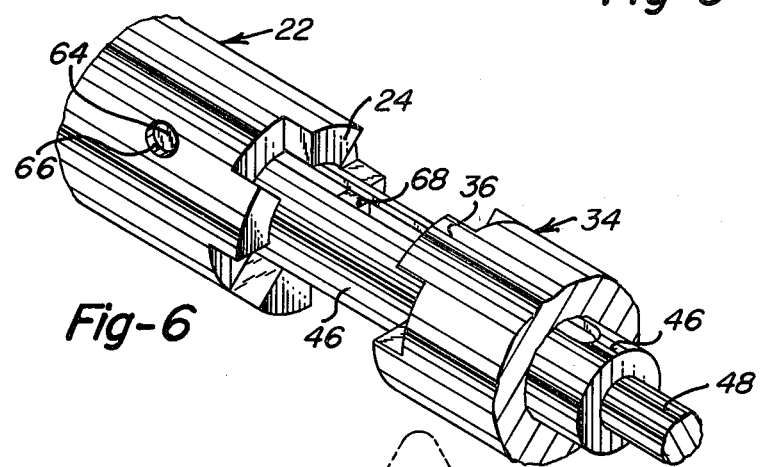
Fig-6
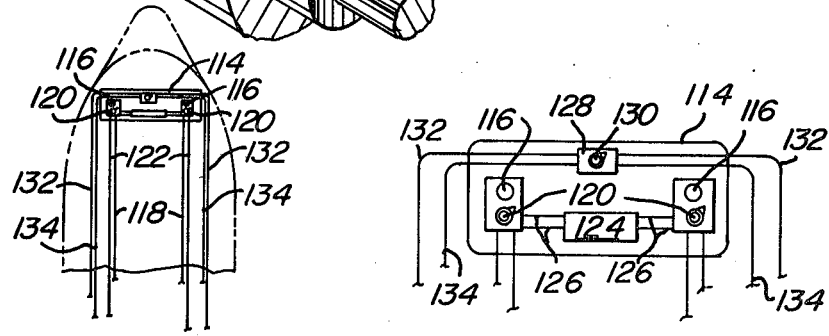
Fig-10
Fig-9
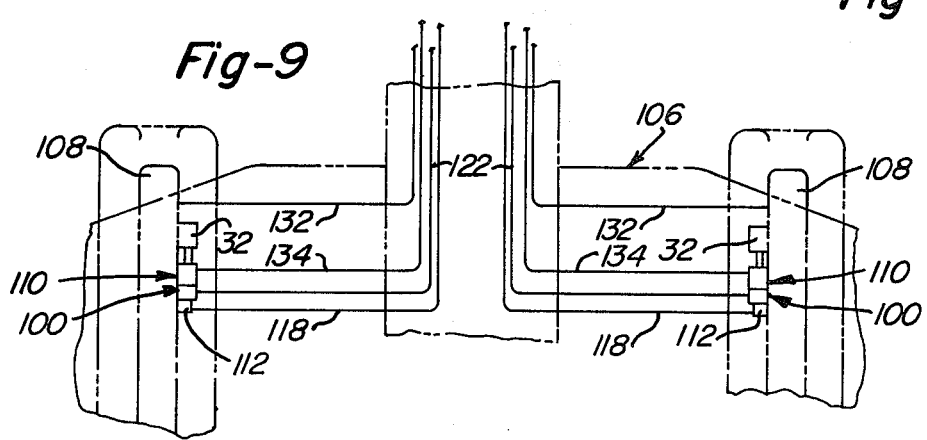

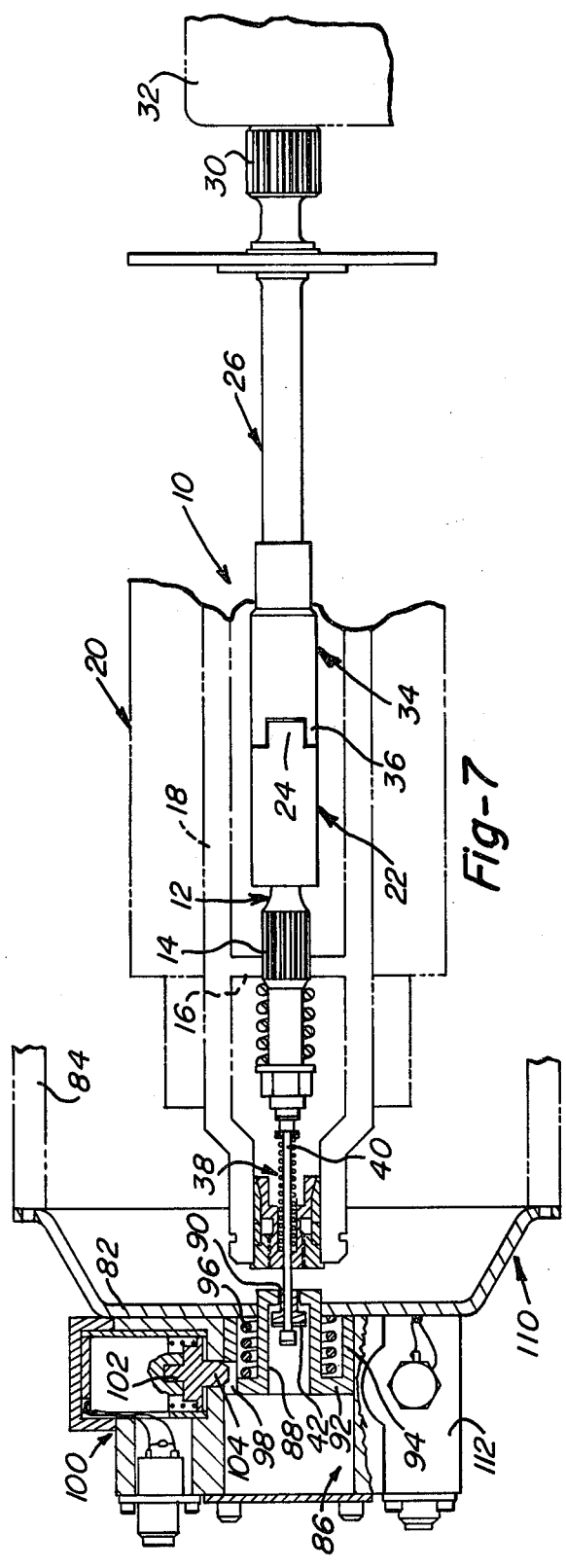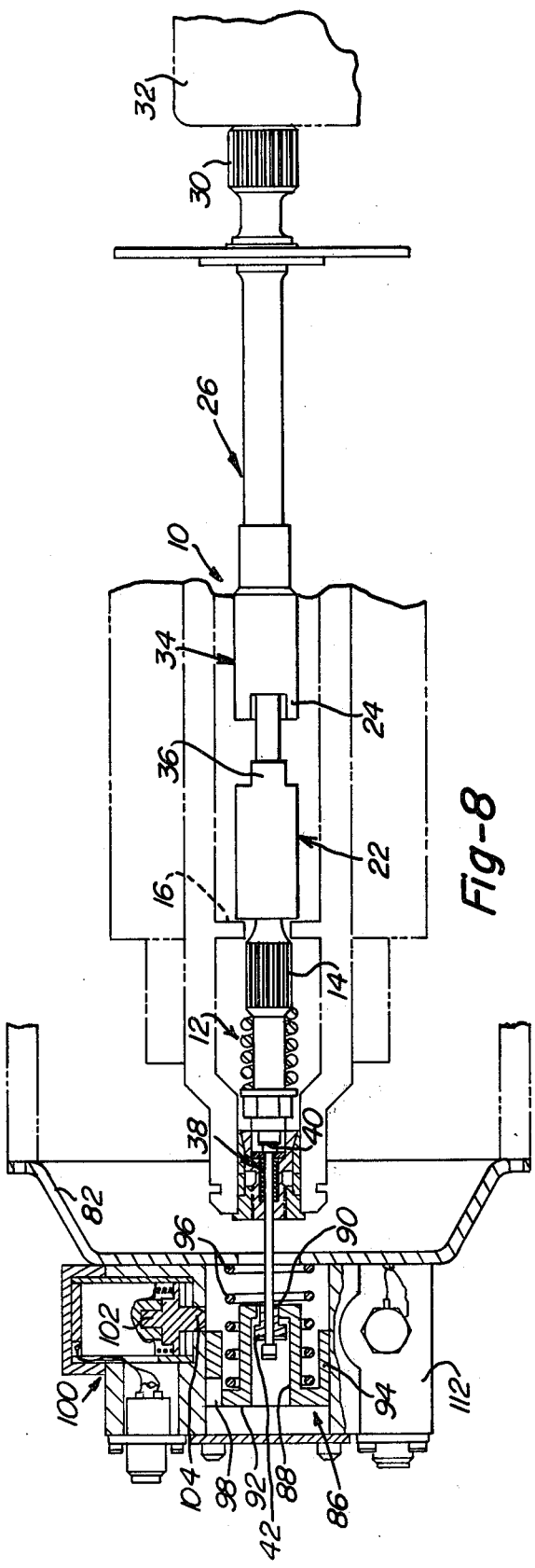

GENERATOR DRIVE CONTROL SYSTEM

BACKGROUND OF THE INVENTION

The apparatus of this invention lies in the field of control systems for generators and is directed to means for decoupling generators mechanically from the engines which drive them in case of mechanical or electrical failure. It is more particularly directed to such means which is remotely controlled by the pilot in the case of an aircraft and may be used in conjunction with other means to prevent decoupling of a properly functioning generator and to supply alternative power to the engine having the decoupled generator.

Aircraft engines are generally provided with generators coupled directly to the engines to provide the necessary power for ignition equipment etc. In multi-engine aircraft each engine has a separate generator. In single engine airplanes, if a generator burns out a bearing or fails electrically, it is necessary to shut down the engine and make an emergency landing to avoid major damage to the generator. In multi-engine airplanes, if one generator fails it is necessary to shut down the engine and continue flight with the other engine or engines to avoid major damage to the generator.

It is desirable to provide a system which enables a pilot to discover promptly any malfunction of the generator and to disconnect the generator in flight by remote control means. It is also desirable to have means to prevent disconnection of a properly functioning generator by mistake in a multi-engine aircraft and to supply alternative electrical energy to the engine having the decoupled generator.

Many different types of apparatus have been proposed and used over the years to couple and decouple power transmission systems, and some have been proposed or are usable in aircraft installations for decoupling accessories on aircraft engines. Among them may be mentioned U.S. Pat. No. 2,710,763 to Gilbert, U.S. Pat. No. 2,942,903 to Giladett, and U.S. Pat No. 2,409,811 to Taylor. Although these mechanisms are suitable for their intended purposes, they do not provide a system which indicates a failure and provides remote control means for decoupling the generator or which prevents erroneous pilot action or which provides an alternative power source.

SUMMARY OF THE INVENTION

The apparatus of the present invention overcomes the difficulties and disadvantages mentioned above and provides a relatively simple and reliable system which gives notice of failure, allows the pilot to decouple the defective generator promptly by remote control, prevents erroneous decoupling, and has means for supplying electrical energy from an alternative source.

Generally stated, the apparatus includes a generator drive train which has means adjacent to one end for driving connection to a generator and means adjacent to its other end for driven connection to an engine. A power transmitting coupling is provided in the drive train. A support member is provided for connection to the generator and a self-powered force unit is movably mounted on the support member.

In the presently preferred form, the drive train includes a shaft having a first end formed for driven connection to a power takeoff or accessory drive pad and a coupling sleeve secured to its second end, the sleeve having a plurality of clutch jaws. The drive train includes another hollow shaft having a drive formation at one end for connection to a generator and a coupling sleeve secured to its other end, the sleeve having clutch jaws to mate with those on the other sleeve. A pull rod extends through the hollow shaft and has an extension passing through both sleeves. A latch pivotally mounted in one sleeve has a latch tooth engaging in the other sleeve to prevent axial separation, and the extension has a detent to maintain the latch tooth in locking position.

The force unit is connected to the free end of the pull rod and is biased to pull it in the decoupling direction, while a restraining means is mounted on the support member and provided with a latch to engage the force unit and prevent its operation. When the latch is disengaged, the force unit is freed and pulls the pull rod, disengaging the latch tooth in the coupling and pulling the coupling members apart. The restraining means includes a solenoid to which the latch is attached.

A sensor is mounted on the generator to sense vibrations resulting from mechanical failure such as a burned out rotor bearing. A suitable panel is provided for mounting in the cockpit and includes signal means electrically connected to the sensor to indicate the failure condition. A decoupling switch is mounted on the panel and may be operated by the pilot in response to the failure signal. It is electrically connected to the solenoid to activate it and withdraw the latch from the force unit, allowing it to accomplish the decoupling function.

If the apparatus is used in a multi-engine aircraft it is duplicated for each engine and generator. In such case, the panel carries a signal means and decoupling switch for each engine. In addition an electronic deactivator may also be mounted on the panel. It is connected to all of the signal means and all of the decoupling switches. When any one signal means is energized the deactivator operates to prevent operation of any decoupler switch other than the switch associated with the active signal means.

A cross-connection switch may also be mounted on the panel with electrical leads to each generator and each engine. Although it may be automatic it is preferably actuated by the pilot to connect an active generator to the engine having the decoupled generator.

In the case of electrical failure of a generator, the same or an additional signal means may be mounted on the panel to indicate the failure condition.

BRIEF DESCRIPTION OF THE DRAWINGS

Various other advantages and features of novelty will become apparent as the description proceeds in conjunction with the accompanying drawings, in which:

FIG. 4 is a sectional view taken on line 4—4 of FIG. 2;

FIG. 5 is an enlarged perspective view of the locked coupling;

FIG. 6 is a similar view of the unlocked and separated coupling;

FIG. 7 is a schematic elevational view, partly in section, of the apparatus connected to a generator, with the coupling members engaged;

FIG. 8 is a view similar to FIG. 7 with the coupling members disengaged;

FIG. 9 is an idealized representation of the apparatus mounted in a two engine airplane; and FIG. 10 is a schematic view of a control panel carrying the signaling and switching devices of the invention.

DESCRIPTION OF PREFERRED EMBODIMENTS

Figure 1:
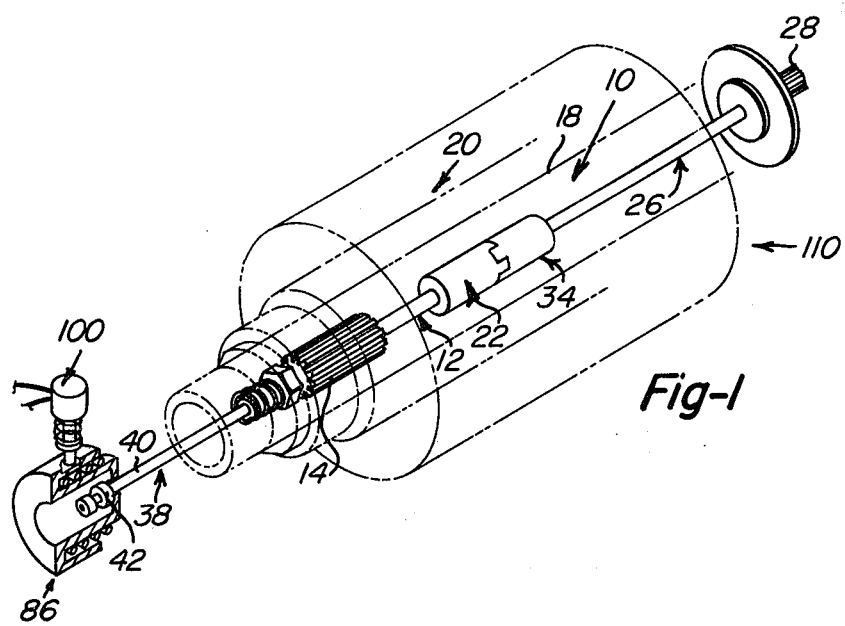
FIG. 1 is a schematic perspective view of the drive train and decoupling mechanism in relation to a generator.

A major portion of the apparatus of the invention is schematically illustrated in FIGS. 7 and 8, in which a generator drive train 10 includes a first hollow shank 12 having a drive formation adjacent to a first end in the form of an elongate spline 14 for connection to a driven spline 16 extending inward from the hollow shaft 18 of the generator rotor 20. A first coupling sleeve 22 is fixedly mounted on the second end of shank 12 and is formed with axially extending clutch jaws 24 on its free end.

A second shank 26 is axially aligned with the first shank and has a formation 28 (FIG. 1) at a first end in the form of a spline for connection to one of the power takeoffs 30 on the accessory drive pad 32. A second coupling sleeve 34 is fixedly mounted on the second end of shank 26 and is formed with axially extending clutch jaws 36 on its free end which engage with clutch jaws 24 in the driving condition shown in FIG. 7.

Figure 2:
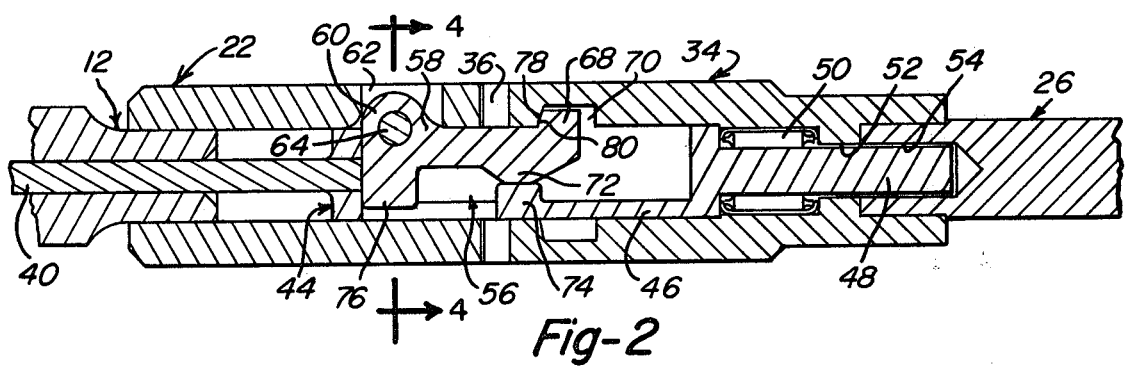
FIG. 2 is a horizontal sectional view of the coupling in locked condition.
Figure 3:
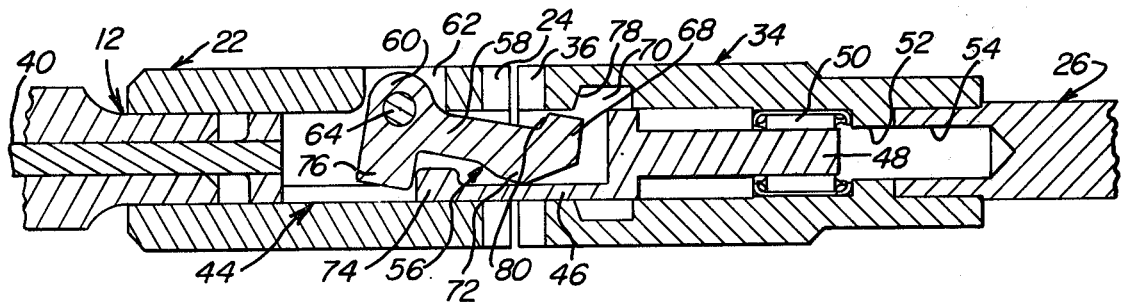
FIG. 3 is a view similar to FIG. 2, showing the coupling in separated condition.

A pull rod 38 has an elongate shaft 40 provided with a puller head 42 at its first end. The shaft is slidably mounted in hollow shank 12 and has an extension 44 at its second end which extends axially slidably within both sleeves 22 and 34, as best seen in FIGS. 2 and 3. The extension has a generally hollow intermediate portion 46 and a short forward shaft 48 which is carried in bearing 50 of sleeve 34 and extends into guide bores 52 and 54 in the coupling and shank 26.

A jaw latch 56 is located within sleeves 22 and 34 and has an elongate arm 58 with an eye portion 60 fitting in radial recess 62 in sleeve 22 and pivotally mounted on lateral pin 64 located in bores 66 as shown in FIG. 4. Latch 56 also has a latch tooth 68 extending outward from the end of arm 58 to seat in radial recess 70 of sleeve 34 and prevent axial separation of the sleeves under normal operating conditions. The recess may be peripherally just wide enough to loosely receive the latch tooth or it may be completely annular as shown. Arm 58 has a depending boss 72 and the extension is formed with a detent 74 which underlies the boss and prevents inward displacement of the latch tooth except during decoupling operation. Arm 58 is also provided with a depending projection 76 which lies in the path of travel of detent 74.

When the generator is to be decoupled from the engine, shaft 40 is forcibly pulled to the left as viewed in FIGS. 1, 2, 3, 7 and 8. Shaft 40 pulls extension 44 to the left, moving detent 74 out from under boss 72 and allowing the latch tooth to swing inward to a position disengaged from recess 74 to allow the sleeves to separately axially. Further movement of the shaft and extension causes detent 74 to strike projection 76 and forcibly swing arm 58 inward while also applying axial force to positively move sleeve 22 away from sleeve 34. To prevent any possibility that the latch tooth might bind in the recess, angled cam surfaces 78 and 80 are formed in the recess and on the latch tooth respectively. Disengagement allows coupling 22 to come to a stop and therefore coupling 34 rotates with respect to coupling 22 and extension 44. The free end of shaft 48 remains in bearing 50 and maintains alignment of the coupling without undue friction.

The mechanism for decoupling jaws 24 from jaws 36 is schematically illustrated in FIGS. 7 and 8. A support member in the form of an end plate 82 closes an open end of generator casing 84 and is attached to it. A force unit 86 includes a cup-shaped member 88 having a central aperture 90 on its bottom wall, an outward flange 92, and a reversely extending outer wall 94, with a compression coil spring 96 coaxially enclosed between member 88 and wall 94. A portion of the wall is cut away at 98 at its junction with the flange to form a latch engaging shoulder.

A solenoid 100 is mounted on end plate 82 and is provided with a spring loaded armature 102 having a latch 104 at its outer end to engage shoulder 98. When the parts are assembled in operating condition with the clutch jaws engaged, the force unit is pressed to the right as viewed in FIG. 7, compressing spring 96, and latch 104 engages shoulder 98 to hold the force unit in cocked or loaded condition. Shaft 40 extends through aperture 90 and its puller head 42 is spaced slightly from the bottom of member 88. When the solenoid is activated it withdraws latch 104 from shoulder 98. The force unit moves rapidly to the left and its impact engagement with puller head 42 forcibly pulls shaft 40 to the left, disengaging jaw latch 56 and producing axial separation of jaws 24 from jaws 36 to decouple the generator from the engine and allow the latter to continue to operate.

The control equipment for the decoupling mechanism is schematically illustrated in FIGS. 9 and 10 as installed in a two engine airplane 106 although it may be used basically the same way in aircraft having any number of engines or in power plant installations of any kind. As shown in FIG. 9, the airplane is provided with engines 108 having accessory drive pads 32, to which are connected generators 110. In addition to the force unit 86 and the solenoid 100, the end plate 82 of each generator carries a sensor 112, shown in FIGS. 7 and 8, which is preferably of the accelerometer type for detecting vibrations indicative of bearing failure in the associated generator. A suitable control panel 114 is mounted in the cockpit in the pilot's field of view. For each engine a signal lamp 116 is mounted on the panel and electrically connected to the appropriate sensor 112 by a conductor 118. A decoupling switch 120 is connected by conductor 122 to the solenoid 100, and is operable by the pilot in response to energization of the signal lamp to decouple the defective generator.

It is highly desirable to prevent any possibility that the pilot may inadvertently operate the wrong switch and decouple a properly functioning generator since it cannot be recoupled in flight. Therefore, an electronic deactivator 124 is provided which is connected by conductors 126 to each signal lamp and each decoupling switch and is constructed to act in response to energization of one signal lamp to deactivate any decoupling switch other than the switch associated with the energized signal lamp.

A cross-connection switch unit 128 with a switch lever 130 is also mounted on the control panel and is connected electrically by leads 132 to each engine and leads 134 to each generator. When the pilot finds it necessary to decouple the generator of one engine he can then provide an alternate source of electrical energy by coupling that engine to the active generator of the other engine through operation of switch lever 130.

It will be apparent that the construction of the decoupling mechanism is very compact, with the drive train passing through the hollow rotor shaft of the generator and the clutch jaws being located within the hollow shaft, and with the activating mechanism being mounted on the generator end plate. The control system is simple and provides for safe decoupling of a generator in flight as well as an alternate source of electrical energy for the engine having the decoupled generator.

What is claimed is:

1. A generator drive control system for use in combination with an airplane having multiple engines, comprising:
    a generator drive train connected to each engine and driven thereby;
    a generator continually powered by each drive train under normal operating conditions;
    a power transmitting coupling in each drive train between the engine and the rotor of the generator;
    separate signal means located in the cockpit to indicate a failure condition of any individual generator;
    separate control means in the cockpit operable by the pilot in response to the failure signal to remotely cause decoupling of the associated drive train coupling; and
    a cross-connection switch with electrical leads to each generator and each engine, wherein the switch is actuatable by the pilot of the airplane to simultaneously electrically connect an active generator, which is continuously powered by an engine drive train under normal operating conditions, to the engine having the decoupled generator.

2. A system as claimed in claim 1; in which
    a failure sensor is connected to each generator and to an associated signal means in the cockpit.

3. A system as claimed in claim 1; in which
    the actuating means for decoupling each generator includes a solenoid mounted on the generator and a decoupler switch in the cockpit electrically connected to the solenoid.

4. A system as claimed in claim 1; in which
    the actuating means for decoupling each generator includes a solenoid mounted on the generator and a decoupler switch in the cockpit electrically connected to the solenoid;
    a failure sensor is connected to each generator and to an associated signal means in the cockpit;
    and an electronic deactivator is connected to all of the signal means and decoupler switches and is operable in response to energization of any one signal means to prevent operation of any decoupler switch other than the switch associated with the active signal means.

5. A system as claimed in claim 1; in which
    each drive train coupling includes a first member movable toward and away from a second member to engage and decouple the coupling;
    an axially movable pull rod having a puller head is connected to the first member;
    a force unit is connected to the puller head and is slidably mounted in the generator casing and spring biased to move in a decoupling direction;
    a movable latch is provided to prevent the decoupling movement;
    and the control means in the cockpit is operable to withdraw the latch to permit the force unit to decouple the coupling.

6. A system as claimed in claim 5; in which
    a solenoid is mounted on the generator casing adjacent to the force unit;
    the latch is connected to the solenoid;
    and the control means in the cockpit comprises a switch electrically connected to the solenoid;
    closing of the switch serving to actuate the solenoid to withdraw the latch.

7. A generator drive and control system comprising:
    at least two generators continually powered under normal operating conditions;
    a drive train for each generator formed for connection to a rotative power source;
    a clutch in each drive train for connecting the generator to and disconnecting it from the power source;
    signal means for each generator located at a central operation station to indicate a failure condition;
    control means at the operation station to cause decoupling of the clutch for the defective generator; and
    a cross-connection switch located at the operation station provided with electrical leads to each generator and the rotative power source, wherein the switch is manually actuatable to simultaneously electrically connect an active generator, which is continuously powered under normal operating conditions, to the rotative power source having the decoupled generator.

8. A system as claimed in claim 7; in which
    the clutch includes a first member movable toward and away from a second member;
    decoupler means is slidably mounted on the generator and is connected to the first clutch member;
    activating mechanism for the decoupler means is mounted on the generator;
    and the control means is connected to the activating mechanism to cause the decoupler means to disengage the first clutch member from the second clutch member.

9. A system as claimed in claim 8; in which
    the decoupler means comprises a pull rod and a force unit connected to the pull rod and spring biased to pull the first clutch member out of engagement with the second clutch member;
    and the activating mechanism comprises a latch to engage and prevent movement of the force unit and a solenoid connected to the latch to withdraw it from engagement with the force unit.

10. A system as claimed in claim 7; in which
    a failure sensor is connected to each generator and to an associated signal means at the operation station.

11. A system as claimed in claim 10; in which
    an electronic deactivator is connected to all of the signal means and to all of the decoupler control means and is operable in response to energization of any one signal means to prevent operation of any decoupler control means other than the control means associated with the active signal means.

12. A generator drive and control system kit comprising:
    a generator drive train having means adjacent to one end for driving connection to a generator and means adjacent to its other end for driven connection to an engine;
    a power transmitting coupling, including a first member movable toward and away from a second member, in the drive train for connecting a generator to and disconnecting it from an engine;

a support member formed for connection to an outside casing of the generator;

a self-powered force unit slidably mounted on the support member and connected to the coupling and operable to decouple it on occasion;

restraining means including a latch to be connected to said support member exteriorly of the generator casing and engaging the force unit to prevent its decoupling operation;

and control means adapted to be located at a remote operation station, connected to the restraining means, and operable to activate the restraining means and withdraw it from engagement with the force unit to permit the force unit to decouple the coupling.

13. A kit as claimed in claim 12 in which;

the force unit is connected to the first member and is spring biased to pull it out of engagement with the second member;

the restraining means includes a latch movable generally perpendicularly to the plane of said first and second movable members and positioned exteriorly thereof to engage and prevent movement of the force unit and a solenoid connected to the latch to withdraw it from engagement with the force unit;

and the control means comprises a decoupling switch electrically connected to the solenoid to activate it.

14. A kit as claimed in claim 12; in which a sensor is mounted on the support member to sense a failure condition of a generator;

and a signal means is provided to be located adjacent to the control means and is electrically connected to the sensor to indicate the failure condition of a generator.

15. A kit as claimed in claim 12; in which switching means is provided to connect an alternate source of electrical power to an engine when its generator is decoupled.

16. A generator drive and control system kit comprising:

a generator drive train including a first hollow shank having a drive formation adjacent to a first end for driving connection to a generator and a first coupling sleeve fixedly mounted on its second end, the sleeve having axially projecting clutch jaws on its free end;

a second shank axially aligned with the first shank and having a formation at a first end for connection to a rotative power source and a second coupling sleeve fixedly mounted on its second end, the sleeve having axially projecting clutch jaws on its free end engageable with the clutch jaws on the first sleeve;

a pull rod having a shaft slidably mounted in the first shank, with a puller head at its first end engageable by the force unit and with an extension fixedly connected to its second end and extending axially slidably within both sleeves;

a radial recess formed in each sleeve;

a jaw latch located within the sleeves and having an elongate arm pivotally mounted at one end about a lateral axis in one of the recesses and a latch tooth at its other end extending into the other recess to hold the clutch jaws in driving engagement and prevent axial separation of the sleeves;

a detent formed in the extension to underlie the latch arm and prevent inwward displacement of the latch tooth;

a self-powered force unit connected to the pull rod;

restraining means engaging the force unit, wherein upon release by the restraining means the force unit is operable to pull the pull rod and extension axially to displace the detent from the latch arm and cause disengagement of the latch tooth and axially separate the coupling sleeves; and control means adapted to be located at a remote operation station, connected to the restraining means, and operable to activate the restraining means and withdraw it from engagement with the force unit.

17. A kit as claimed in claim 16; in which the jaw latch arm is pivotally mounted in the first sleeve and is provided with a depending projection in the path of travel of the detent;

and releasing movement of the detent causes it to strike the projection and forcibly swing the latch tooth inwardly to disengaging position.

18. A kit as claimed in claim 16; in which a generator is provided, having a hollow rotor shaft;

the drive train is located axially within the hollow shaft;

the drive formation on the drive train is an elongate spline;

and the rotor shaft is provided with a spline slidably fitting over the drive train spline.

19. A kit as claimed in claim 18; in which the driving spline is slidable in the driven spline;

and the driven spline engages a first portion of the driving spline when the clutch jaws are engaged and a second portion when the clutch jaws are axially disengaged.

20. A kit as claimed in claim 18; in which the jaw clutch members are located at a position intermediate the ends of the drive train and are within the hollow rotor shaft in assembled relation with the generator.

21. A generator drive control system for use in combination with an airplane having multiple engines, comprising:

a generator drive train connected to each engine and driven thereby;

a generator powered by each drive train and having an outer casing to contain said generator;

a power transmitting coupling in each drive train between the engine and the rotor of the generator, wherein each drive train coupling includes a first member movable toward and away from a second member to engage and decouple the coupling;

an axially movable pull rod having a puller head connected to the first member;

a force unit connected to the puller head and slidably mounted on the generator casing exteriorly thereof and spring biased to pullingly move in a decoupling direction;

a latch movable generally perpendicularly to the plane of said first and second movable members and positioned exteriorly of said first and second members to prevent the decoupling movement;

separate signal means located in the cockpit to indicate a failure condition of any individual generator; and separate control means in the cockpit operable by the pilot in response to the failure signal to withdraw the latch to permit the force unit to decouple the coupling.

22. A generator drive and control system comprising:

at least two generators wherein each of said generators has an outer casing for containing one generator;

a drive train for each generator formed for connection to a rotative power source;

a clutch in each drive train including a first member movable toward and away from a second member;

decoupler means slidably mounted on the generator and connected to the first clutch member, wherein said decoupler means comprises a pull rod and a force unit positioned exteriorly of said generator casing and connected to the pull rod and spring biased to pull the first clutch member out of engagement with the second clutch member; and signal means for each generator located at a central operation station to indicate a failure condition and control means at the operation station to cause decoupling of the clutch from the defective generator.

23. A system as claimed in claim 22, in which:

an activating mechanism for the decoupler means is mounted on the generator, wherein the activating mechanism comprises a latch located exteriorly of said first and second clutch members to engage and prevent movement of the force unit and a solenoid connected to the latch to withdraw it from engagement with the force unit; and the control means is connected to the activating mechanism to cause the decoupler means to disengage the first clutch member from the second clutch member.

* * * * *